No. 769,364. PATENTED SEPT. 6, 1904.
H. M. TORY & H. T. BARNES.
PYROMETER.
APPLICATION FILED APR. 2, 1904.
NO MODEL. 2 SHEETS—SHEET 1.
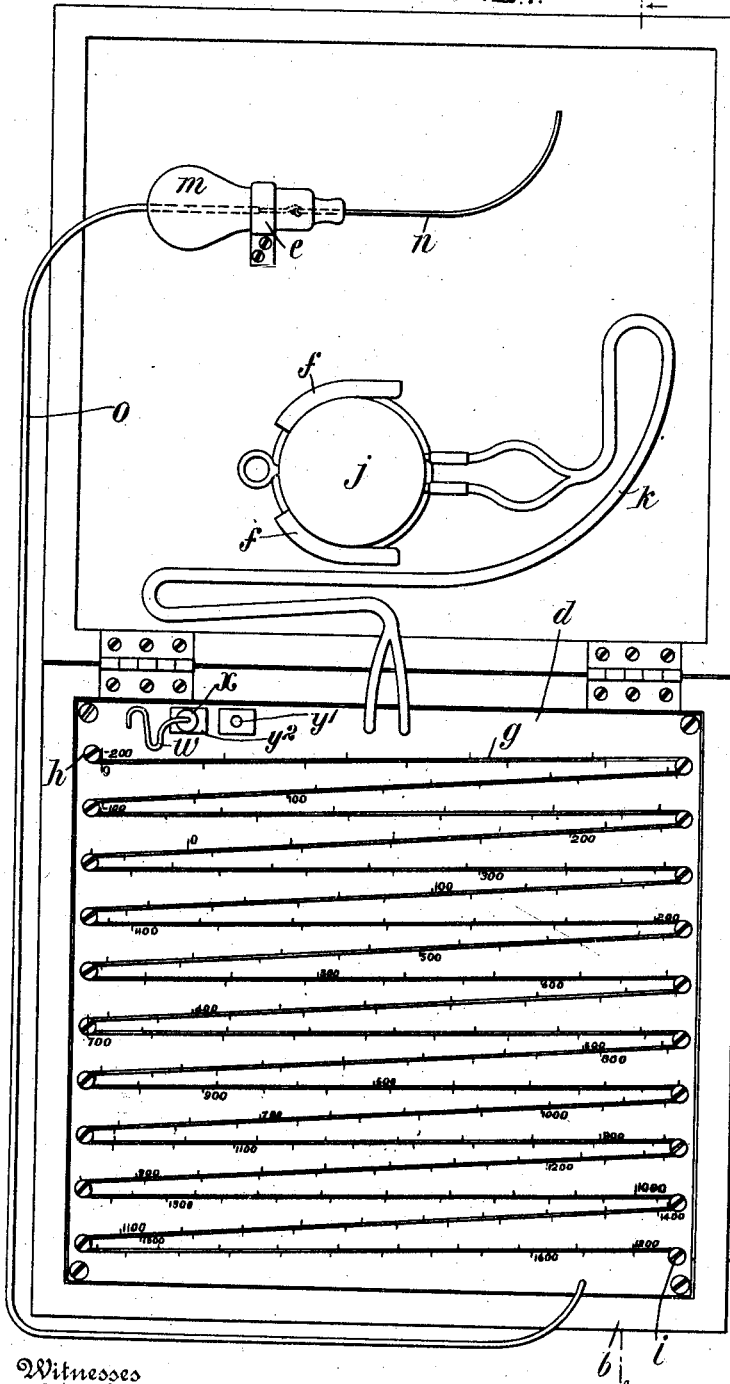
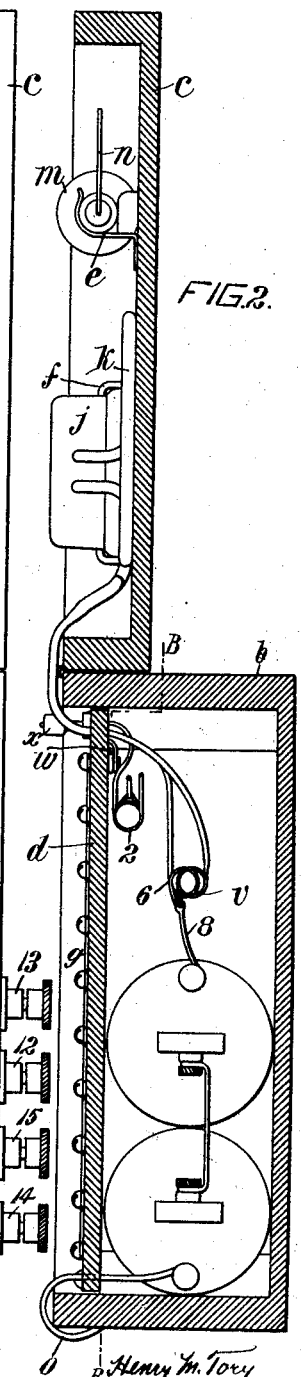
Witnesses
Alex Carrie
Fred Sears
Henry M. Tory
Howard T. Barnes
Inventors
By Attorney

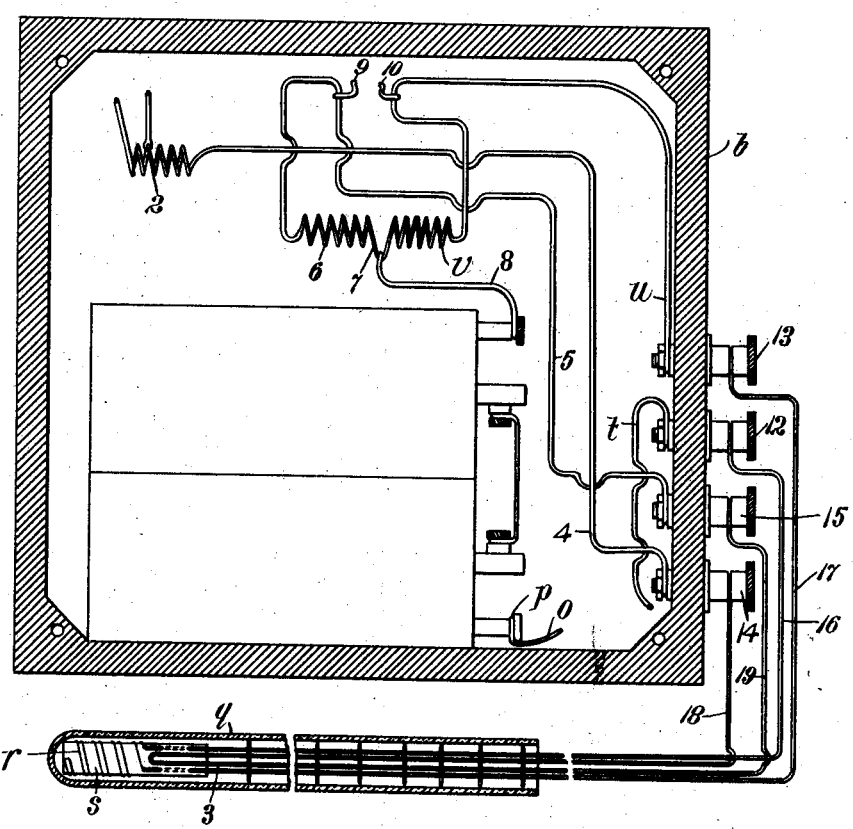
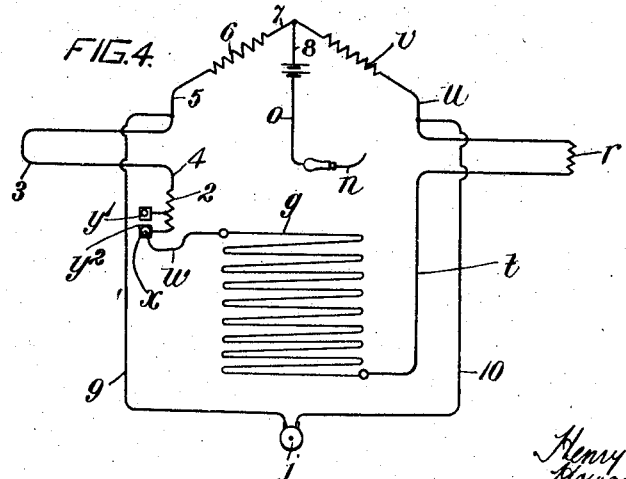

No. 769,364. Patented September 6, 1904.

UNITED STATES PATENT OFFICE.

HENRY MARSHALL TORY AND HOWARD TURNER BARNES, OF MONTREAL, CANADA.

PYROMETER.

SPECIFICATION forming part of Letters Patent No. 769,364, dated September 6, 1904.

Application filed April 2, 1904. Serial No. 201,307. (No model.)

*To all whom it may concern:*

Be it known that we, HENRY MARSHALL TORY, M. A., B. D., D. Sc., and HOWARD TURNER BARNES, D. Sc., F. R. S. C., both of the city of Montreal, district of Montreal, and Province of Quebec, Canada, have invented certain new and useful Improvements in Pyrometers; and we do hereby declare that the following is a full, clear, and exact description of the same.

Our invention has for its object to provide an instrument adapted to emit sound, whereby the temperature of a certain space or thing may be ascertained; and to this end the invention may be said briefly to consist of a device adapted to be varied when subjected to the temperature of a space or thing the temperature whereof is to be determined and means under the influence of the variations of said device for giving audible indication, whereby the degree of such temperature may be ascertained.

More specifically speaking, our invention may be said to consist of a pyrometer proper (consisting of a resistance-pyrometer of usual construction) included in an electric circuit, which also includes a pair of resistance-coils, one on each side thereof, to cause a division of the current, a scale consisting of a calibrated contact-piece, a second contact-piece, said contact-pieces being adapted to be brought into electrical connection, and a device for emitting sound, such as a telephone, the arrangement of said elements being adapted to provide under normal conditions and when the contacts are brought into electrical connection and in certain predetermined relation a point of equilibrium upon the scale between the opposite sides of the circuit, this point being also a point of silence in the telephone. All other points on such scale or positions of said contacts while in electrical connection (provided the temperature of the pyrometer proper, and therefore the space or thing to which it is subjected, remains the same) will cause a disturbance audible in the telephone. When the temperature to which the pyrometer is subjected varies, the position of the point of silence upon the scale will vary accordingly, thereby enabling the temperature to be ascertained orally. The scale may be calibrated to suit different requirements.

For full comprehension, however, of our invention reference must be had to the accompanying drawings, forming a part of this specification, in which similar reference characters indicate the same parts, and wherein—

Figure 1 is a plan view of our improved instrument with the cover of the box thrown open. Fig. 2 is a longitudinal vertical sectional view thereof, taken on line A A, Fig. 1. Fig. 3 is a horizontal sectional view taken on line B B, Fig. 2; and Fig. 4 is a diagrammatical view illustrating particularly the circuits of our improved instrument.

The preferred embodiment of our invention, which is illustrated in the accompanying drawings, is carried for convenience in a box which may be of any approved type, but preferably comprising a body portion $b$ and a cover $c$, and the body portion has a false bottom $d$, which supports our improved calibrated contact-piece or scale, to be presently described, while the space between the false bottom and the bottom proper accommodates the battery, the coils, and the wiring to effect electrical connection between the parts of our instrument, the cover of the box being provided with a rigid clip $e$ and a pair of rigid clips $f$ to facilitate the carrying of our improved portable contact and the telephone.

Our improved scale consists of a length of wire $g$, connected at one end to a binding-screw $h$, located at one corner of the box and taken in a zigzag manner to a second binding-screw $i$, located at the diagonally opposite corner of the box, while a portion of the false bottom contiguous to this wire is marked with numerals to indicate degrees from zero to sixteen hundred along the under side of the wire, and a second series of numerals indicating degrees from two hundred below zero to twelve hundred above zero is marked upon this false bottom contiguous to the upper side of the wire.

The telephone we use is indicated at $j$ and is of usual construction and connected to opposite sides of the battery-circuit by a flexible electric connection, (indicated at $k$.)

Our improved portable contact consists of an insulated handle $m$, having a resilient contact-wire $n$ projecting out of one end thereof, and a flexible electrical conductor $o$ has one end rigidly secured to the opposite end of this handle and electrically connected in the interior of the latter to the inner end of the resilient contact-wire, while the opposite end of this flexible electrical connection is electrically connected to one pole of the battery, as at $p$.

The pyrometer proper is of ordinary construction and consists of a porcelain tube $q$, in the inner end of which is located a coil $r$, of platinum wire, wound around a mica core $s$, into which is inserted the end of a loop 3. The wiring of our improved instrument is as follows: The terminals of the coil $r$ are connected by wires $t$ and $u$ to one end of the calibrated wire constituting the scale and to one terminal of a resistance-coil $v$, and a wire $w$ leads from the opposite end of the calibrated wire to a plug $x$, adapted to be inserted in either of a pair of sockets $y'$ and $y^2$, which are in electrical connection with different points of a coil 2, adapted to present resistance to the battery-circuit in compensation for the resistance of coil $r$ in the opposite side of such circuit. One end, 4, of the loop 3 is connected to one end of coil 2, and the other end, 5, of such loop is connected to one terminal of a resistance-coil 6, corresponding in capacity to coil $v$ and to which it is connected by a wire 7, while this wire is connected midway of its length by a wire 8 to the pole of the battery opposite to that to which the flexible conductor $o$ of the portable contact $n$ is connected. A pair of leads 9 and 10 respectively connect the flexible conductors of the telephone to the wires 5 and $u$.

To facilitate the connection or disconnection of the pyrometer, the wires $t$, $u$, 4, and 5 are connected to the inner ends of binding-posts 12, 13, 14, and 15, to the outer ends of which are connected the flexible leads 16, 17, 18, and 19, connected to the pyrometer. The function of the coil 2 is to provide resistance that will so balance the pyrometer-coil $r$ as to bring the point of silence—say, for instance "zero"—to a suitable point on the scale. When a wide range of temperatures above zero is to be read, the plug should be inserted in socket $y^2$, thereby including the resistance of the whole of coil 2. Each scale illustrated reads in centigrade measurement.

Operation: In the operation of our invention, which we term a "thermophone," the pyrometer $q$ is inserted in the space or placed in contact with the thing the temperature whereof is to be ascertained, the telephone is placed to the ear, and the portable contact touched along the calibrated wire. When the portable contact touches a point on the calibrated wire, which exactly divides the resistance of the coils $r$, 2, $v$, and 6 and the wiring, there will be no disturbance heard in the telephone, and this point of silence denotes the temperature of the pyrometer proper, and consequently the space or thing to which it is subjected. When the portable contact touches any other point along the calibrated wire or scale, a disturbance is heard in the telephone, because a portion of the current will then pass therethrough, owing to the inequality in the electromotive force at the terminals of the telephone, due to the inequality of the resistance of the two paths open to the current. If it be desired to read below zero as well as above zero, but to a less extent in the latter case, the plug $x$ should be moved to socket $y'$, thereby bringing the normal point of silence to the zero-point in the scale along the upper side of the calibrated wire.

Any other scale than either of those illustrated may be used and other changes made in the precise construction illustrated without departing from the spirit of our invention.

What we claim is as follows:

1. In an instrument for measuring temperature the combination of a pyrometer containing a coil and loop; a calibrated contact and a second contact adapted to be brought into electrical connection with same; a normally open main electric circuit having its terminals connected to said contacts and forming two paths which respectively include the coil and loop of said pyrometer; a resistance-coil located in each of said paths; a supplemental resistance-coil in one of said paths; and a telephone-circuit connected with said main circuit, substantially as described.

2. In an instrument for measuring temperature, the combination with a device adapted to be varied when subjected to the temperature of a space or thing, the temperature whereof is to be determined, said device including a coil and a loop; of a calibrated contact-piece, a second contact-piece, said contacts being adapted to be brought into electrical connection with one another; a normally open electric circuit having one terminal connected to one end of one of said contact-pieces, and its other terminal divided and connected to opposite ends of the other contact-piece thus forming two paths, a pair of resistance-coils, one located in each of said paths, one path of said divided circuit having the loop included therein and one of said paths including resistance means augmenting the resistance-coil included in the said last-mentioned path, and the other path of such circuit having the pyrometer-coil proper included therein, a branch circuit connected to one end of said main circuit and including a telephone therein, and a battery included in the other end of said main circuit.

3. In an instrument for measuring temperature, the combination with a device adapted to be varied when subjected to the temperature of a space or thing, the temperature whereof is to be determined, said device including a coil and a loop, of a calibrated contact-piece, a second contact-piece, said contacts being adapted to be brought into electrical connection with one another, a normally open electric circuit having one terminal connected to one end of one of said contact-pieces, and its other terminal divided and connected to opposite ends of the other contact-piece thus forming two paths, a pair of resistance devices one located in each of said paths, one of said resistance devices being variable one path of said divided circuit having the loop and a compensating coil included therein, and the other path of such circuit having a pyrometer-coil proper included therein, a branch circuit connected to one end of said main circuit and including a telephone therein, and a battery included in the other end of said main circuit.

4. In an instrument for measuring temperature, the combination with a device adapted to be varied when subjected to the temperature of a space or thing, the temperature whereof is to be determined, said device including a coil and a loop, of a calibrated contact-piece, a second contact-piece, said contacts being adapted to be brought into electrical connection with one another, a normally open electric circuit having one terminal connected to one end of one of said contact-pieces, and its other terminal divided and connected to opposite ends of the other contact-piece thus forming two paths, a pair of resistance-coils of corresponding capacity, one located in each of said paths, one path of said divided circuit having the loop and a compensating coil included therein, and the other path of such circuit having the first-mentioned coil included therein, a branch circuit connected to one end of said main circuit and including a telephone therein, and a battery in the other end of said main circuit.

5. In an instrument for measuring temperature, the combination with a device adapted to be varied when subjected to the temperature of a space or thing, the temperature whereof is to be determined, said device including a pyrometer-coil proper and a loop, of a calibrated contact-piece, a second contact-piece, said contacts being adapted to be brought into electrical connection with one another, a normally open electric circuit having one terminal connected to one end of one of said contact-pieces, and its other terminal divided and connected to opposite ends of the other contact-piece thus forming two paths, a pair of resistance-coils of corresponding capacity, one located in each of said paths, one path of said divided circuit having the loop and a compensating coil included therein, and the other path of such circuit having the pyrometer-coil proper included therein, a branch circuit connected to one end of said main circuit and including a telephone therein, and a battery included in the other end of said main circuit.

6. In a pyrometer, the combination with a device adapted to be varied when subjected to the temperature of a space or thing, the temperature whereof is to be determined said device including a pyrometer-coil proper and a loop, of a stationary contact-piece, a contact-piece movable along said stationary contact-piece, and means denoting the extent of movement of said movable contact-piece relatively to the stationary contact-piece, a normally open electric circuit having one terminal connected to one end of one of said contacts, and its other terminal divided and connected to opposite ends of the other contact thus forming two paths, a pair of resistance-coils of corresponding capacity, one located in each of said paths, one path of said divided circuit having the loop and a variable compensating coil included therein, and the other path of such circuit having the pyrometer-coil proper included therein, a branch circuit connected to one end of said main circuit and including a telephone therein, a battery included in the other end of said main-circuit connection with said calibrated contact.

7. In a pyrometer, the combination with a device adapted to be varied when subjected to the temperature of a space or thing, the temperature whereof is to be determined said device including a pyrometer-coil proper and a loop, of a stationary contact a scale adjacent such contact and having duplex calibrations thereon a second contact, said contacts being adapted to be brought into electrical connection with one another, a normally open electric circuit having one terminal connection to one end of one of said contacts, and its other terminal divided and connected to opposite ends of the other contact thus forming two paths, a pair of resistance-coils of corresponding capacity, one located in each of said paths, one path of said divided circuit having the loop and a variable compensating coil included therein, and the other path of such circuit having the pyrometer-coil proper included therein, a branch circuit connected to one end of said main circuit and including a telephone therein, and a battery included in the other end of said main circuit.

8. In a pyrometer, the combination with a device adapted to be varied when subjected to the temperature of a space or thing, the temperature whereof is to be determined said device including a pyrometer-coil proper and a loop, of a stationary contact, a scale adjacent such contact and having duplex calibrations thereon, a contact movable along said stationary contact, and means denoting the extent of movement of said movable contact relatively to the stationary contact having duplex calibrations, a normally open electric circuit having one terminal connected to one end of one of said contacts, and its other terminal divided and connected to opposite ends of the other contact thus forming two paths, a pair of resistance-coils of corresponding capacity, one located in each of said paths, one path of said divided circuit having the loop and a variable compensating coil included therein, and the other path of such circuit having the pyrometer-coil proper included therein, a branch circuit connected to one end of said main circuit and including a telephone therein, a battery included in the other end of said main-circuit connection with said calibrated contact.

9. The combination with a pyrometer including a pyrometer proper and a loop, of an elongated contact, a scale adjacent such contact and bearing duplex calibrations a second contact, said contacts being adapted to be brought into electrical connection, an electric circuit consisting of a wire leading from one end of said calibrated contact to one end of the pyrometer-coil, a pair of resistance-coils of corresponding capacity, a variable compensating coil adapted to compensate the resistance of the pyrometer-coil, a wire leading from the opposite end of the pyrometer-coil to one end of one of the coils of said pair, a wire connecting the opposite terminal of said last-mentioned coil to one terminal of the other coil of said pair, a wire connecting the opposite terminal of the last-mentioned coil to one end of the loop, a wire connecting the opposite end of the loop to one end of the compensating coil to the end of the calibrated contact opposite to that to which the first-mentioned wire is connected, a wire connected at one end to the second-mentioned contact and at its other end to the wire connecting the pair of resistance-coils together, the calibrated contact and the second-named contact constituting the terminals of the circuit which is normally open, the portion of the circuit from the second-named contact to the pair of resistance-coils including a battery therein, and a branch having its ends connected to portions of the main circuit adjacent to the ends of the resistance-coils opposite to those connected together and said branch circuit including a telephone therein.

10. The combination with a pyrometer including a pyrometer proper and a loop, an elongated contact a scale adjacent such contact and bearing duplex calibrations a portable contact, said portable contact being adapted to be brought into electrical connection with said calibrated contact, an electric circuit consisting of a wire leading from one end of said calibrated contact to one end of the pyrometer-coil, a pair of resistance-coils of corresponding capacity, a variable compensating coil adapted to compensate the resistance of the pyrometer-coil, a wire leading from the opposite end of the pyrometer-coil to one end of one of the coils of said pair, a wire connecting the opposite terminal of said last-mentioned coil to one terminal of the other coil of said pair, a wire connecting the opposite terminal of the last-mentioned coil to one end of the loop, a wire connecting the opposite end of the loop to one end of the compensating coil, a wire connecting the other terminal of said compensating coil to the end of the calibrated contact opposite to that to which the first-mentioned wire is connected, a wire connected at one end to the second-mentioned contact and at its other end to the wire connecting the pair of resistance-coils together, the calibrated contact and the second-named contact constituting the terminals of the circuit which is normally open, the portion of the circuit from the second-named contact to the pair of resistance-coils including a battery therein, and a branch circuit having its ends connected to portions of the main circuit adjacent to the ends of the resistance-coils opposite to those connected together, and said branch circuit including a telephone therein.

11. The combination with a pyrometer including a pyrometer proper and a loop, of a calibrated contact, a second contact, said contacts being adapted to be brought into electrical connection, an electric circuit consisting of a wire leading from one end of said calibrated contact to one end of the pyrometer-coil, a pair of resistance-coils of corresponding capacity, and a compensating coil adapted to compensate the resistance of the pyrometer-coil, a wire leading from the opposide end of the pyrometer-coil to one end of one of the coils of said pair, a wire connecting the opposite terminal of said last-mentioned coil to one terminal of the other coil of said pair, a wire connecting the opposite terminal of the last-mentioned coil to one of the loop, a wire connecting the opposite end of the loop to one end of the compensating coil, a wire connecting the other terminal of said compensating coil to the end of the calibrated contact opposite to that to which the first-mentioned wire is connected, a wire connected at one end to the second-mentioned contact and at its other end to the wire connecting the pair of resistance-coils together, the calibrated contact and the second-named contact constituting the terminals of the circuit which is normally open and the portion of the circuit from the second-named contact to the pair of resistance-coils including a battery therein, and a branch circuit having its ends connected to portions of the main circuit adjacent to the opposite ends of the resistance-coils opposite to those connected together, and said branch circuit including a telephone therein.

In testimony whereof we have affixed our signatures in presence of two witnesses.

HENRY MARSHALL TORY.
HOWARD TURNER BARNES.

Witnesses:
WILLIAM S. McFEAT,
FRED. J. SEARS.